(12) United States Patent
Hittie et al.

(10) Patent No.: US 7,714,525 B2
(45) Date of Patent: May 11, 2010

(54) REVERSING CIRCUIT FOR ICE DELIVERY SYSTEM

(75) Inventors: William Hittie, Mount Prospect, IL (US); Bruce Nielson, Madison, OH (US)

(73) Assignee: Merkle-Korff Industries, Inc., Des Plaines, IL (US)

( * ) Notice: Subject to any disclaimer, the term of this patent is extended or adjusted under 35 U.S.C. 154(b) by 0 days.

(21) Appl. No.: 11/626,114

(22) Filed: Jan. 23, 2007

(65) Prior Publication Data

US 2008/0174256 A1    Jul. 24, 2008

(51) Int. Cl.
   *H02P 3/00*    (2006.01)
(52) U.S. Cl. .............................. 318/280; 62/59; 62/430
(58) Field of Classification Search .................. 62/154, 62/140, 228.4, 323.3, 459, 59, 228.2, 238.5, 62/332, 430; 310/75 R; 318/11, 101, 256, 318/280, 400.01, 400.26, 400.29, 700, 135, 318/119, 690; D15/79, 80; 388/907.2; 340/580
   See application file for complete search history.

(56) References Cited

U.S. PATENT DOCUMENTS

| | | | | |
|---|---|---|---|---|
| 2,630,091 A | * | 3/1953 | Bonnington et al. | 114/122 |
| 3,207,366 A | * | 9/1965 | Feistel, Jr. | 222/2 |
| 5,037,004 A | * | 8/1991 | Katz et al. | 222/146.6 |
| 5,799,822 A | * | 9/1998 | Rudewicz et al. | 221/150 HC |
| 5,975,348 A | * | 11/1999 | Rudewicz et al. | 221/150 R |
| 6,054,785 A | * | 4/2000 | Kerdjoudj et al. | 310/40 MM |
| 6,438,976 B2 | * | 8/2002 | Shapiro et al. | 62/135 |
| 6,617,726 B1 | * | 9/2003 | Tsergas | 310/75 R |
| 6,637,217 B2 | * | 10/2003 | Kim et al. | 62/125 |
| 6,655,158 B1 | * | 12/2003 | Wiseman et al. | 62/73 |
| 6,940,238 B2 | * | 9/2005 | Gerfast | 318/400.29 |
| 6,998,744 B2 | * | 2/2006 | Tsergas | 310/83 |
| 7,278,277 B2 | * | 10/2007 | Son | 62/344 |
| 7,426,838 B1 | * | 9/2008 | Shapiro et al. | 62/353 |
| 2004/0135537 A1 | * | 7/2004 | Conner et al. | 318/701 |
| 2009/0165492 A1 | * | 7/2009 | Wilson et al. | 62/344 |

\* cited by examiner

*Primary Examiner*—Bentsu Ro
*Assistant Examiner*—Antony M Paul
(74) *Attorney, Agent, or Firm*—Sonnenschein Nath & Rosenthal LLP; Brian R. McGinley

(57) ABSTRACT

The present invention comprises a gear motor assembly and control system for use with ice crushers and the other similar devices. The assembly utilizes a novel reversing circuit which allows the use of a bidirectional DC powered gear motor in existing refrigerator and freezer configurations, which heretofore used AC powered gear motors, to power ice crushing and dispensing apparatus.

6 Claims, 5 Drawing Sheets

Related Art

REVERSING CIRCUIT FOR ICE DELIVERY SYSTEM

BACKGROUND OF THE INVENTION

1. Field of the Invention

The present invention generally relates to gear motor assemblies and control systems and, in particular, to a gear motor assembly and control system for use with ice dispensers, crushers and other similar devices. The assembly utilizes a novel reversing circuit which allows the use of a bidirectional DC powered gear motor in existing refrigerator and freezer configurations, which heretofore used unidirectional AC powered gear motors, to power and control ice crushing and dispensing apparatus.

2. Description of the Related Art

Electromechanical devices such as ice crushers and ice dispensers in freezers and refrigerators are often powered by small motors that take the form of gear motors. With the continuing objective of minimizing the size of such motor assemblies, it has been a constant struggle to design a motor assembly for use with such devices that not only produces the required high torque output but that makes efficient use of the space within the devices.

Many freezer and refrigerator manufacturers configure their product's electrical systems for unidirectional AC gear motor and solenoid assemblies to accomplish the ice crushing or ice dispensing cycle. FIG. 1 shows a typical electrical control system of an ice delivery mechanism utilizing a unidirectional AC shaded pole gear motor M and an AC solenoid S1. During an ice dispensing cycle L1 (115 V, approximately 300 watts) is energized powering the shaded pole motor and cubed ice is dispensed. During an ice crushing or shaving cycle, L1 is powered and L2 (115V, approximately 30 watts) is also powered to engage the solenoid (typically when the solenoid is powered a mechanical element such as a knife is engaged to crush or shave the ice).

It is desirable to incorporate a solid state DC gear motor control system into existing refrigerators or freezers without having to change the basic electrical wiring within the refrigerators or freezers. The unidirectional AC powered gear motors heretofore used require additional mechanical elements (engaged by the solenoid) to crush or shave ice. The AC gear motors also require high voltage, double pole, double throw relays, and are more expensive and less reliable than solid state DC controls. The present invention provides a novel solution to address these problems.

SUMMARY OF THE INVENTION

Accordingly, the present invention provides a gear motor assembly that utilizes a novel reversing circuit which allows the use of a DC powered gear motor in existing product configurations, which heretofore used AC powered gear motors, with minimal or no changes, to power ice crushing apparatus. The present invention comprises a control circuit with, for example, a MOSFET H-Bridge for switching voltage polarity to the motor windings allowing the motor to run bi-directionally (clockwise or counterclockwise). Cubed ice can be dispensed by rotating the motor clockwise, crushed or shaved ice can be dispensed by rotating the motor counterclockwise.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims. A more complete appreciation of the invention and many of the advantages thereof will be readily obtained as the same becomes better understood by references to the detailed description when considered in connection with the accompanying drawings, wherein:

DETAILED DESCRIPTION OF THE PREFERRED EMBODIMENT

As required, one or more detailed embodiments of the present invention are disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
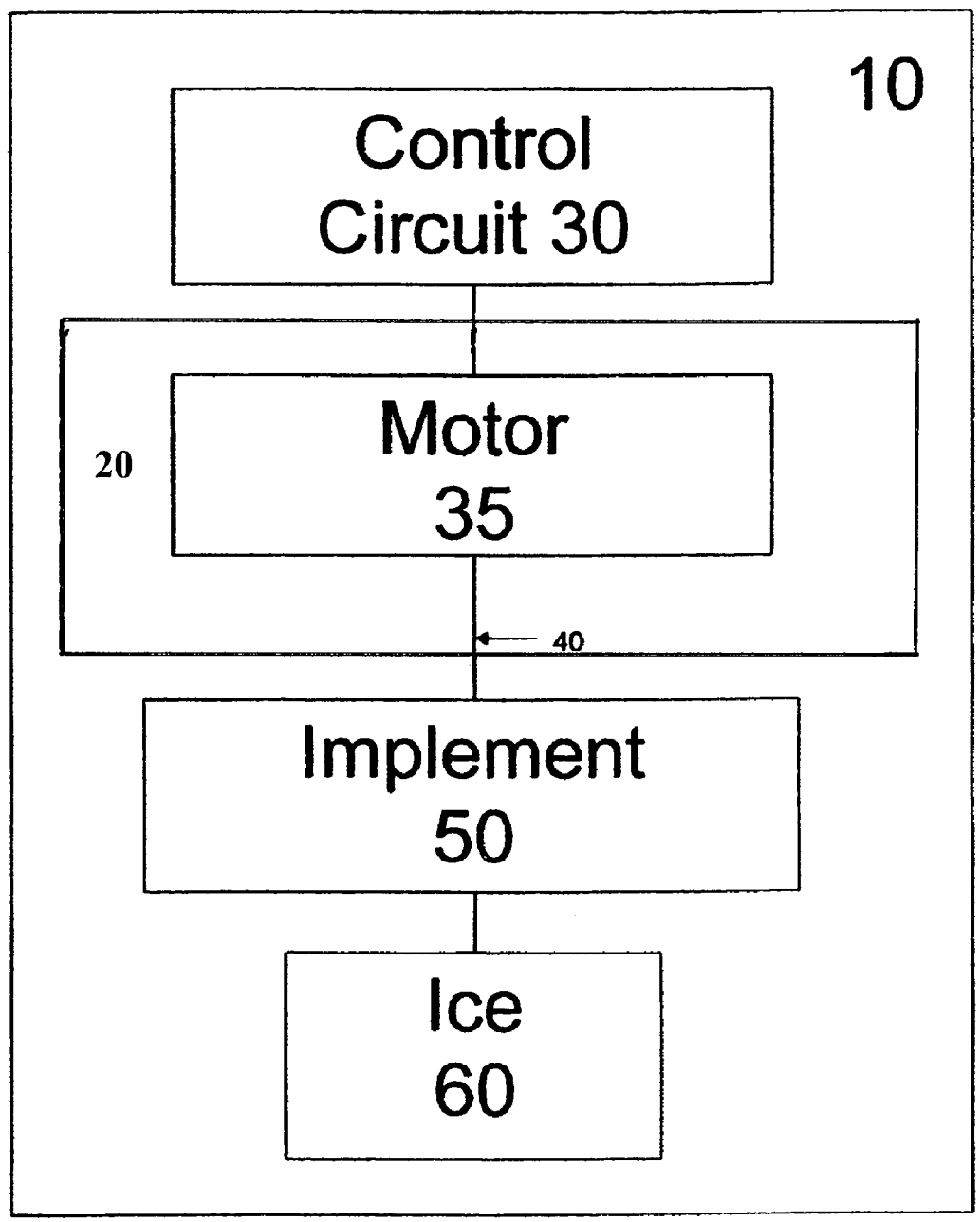
FIG. 2 is a schematic illustration of ice dispensing apparatus of the present invention.

FIG. 2 is a schematic illustration of the ice dispensing cycle of the present invention. A freezer or refrigerator housing 10 is provided and houses a gear motor assembly 20. Typically the gear motor assembly 20 is positioned within the freezer compartment or within an outer door of the freezer or refrigerator 10. The gear motor assembly 20 is controlled by circuit 30, which is discussed in detail below. The gear motor assembly 20 includes a bidirectional DC motor 35, and an output shaft 40 which can be rotated freely in both a clockwise direction and in a counterclockwise direction by the motor 35. The output shaft 40 is attached to one or more implements 50 (such as an ice crusher, ice shave, etc.) to dispense, crush, and/or shave ice 60, based, for example, on user selection or based on automatic selection.

Figure 1:
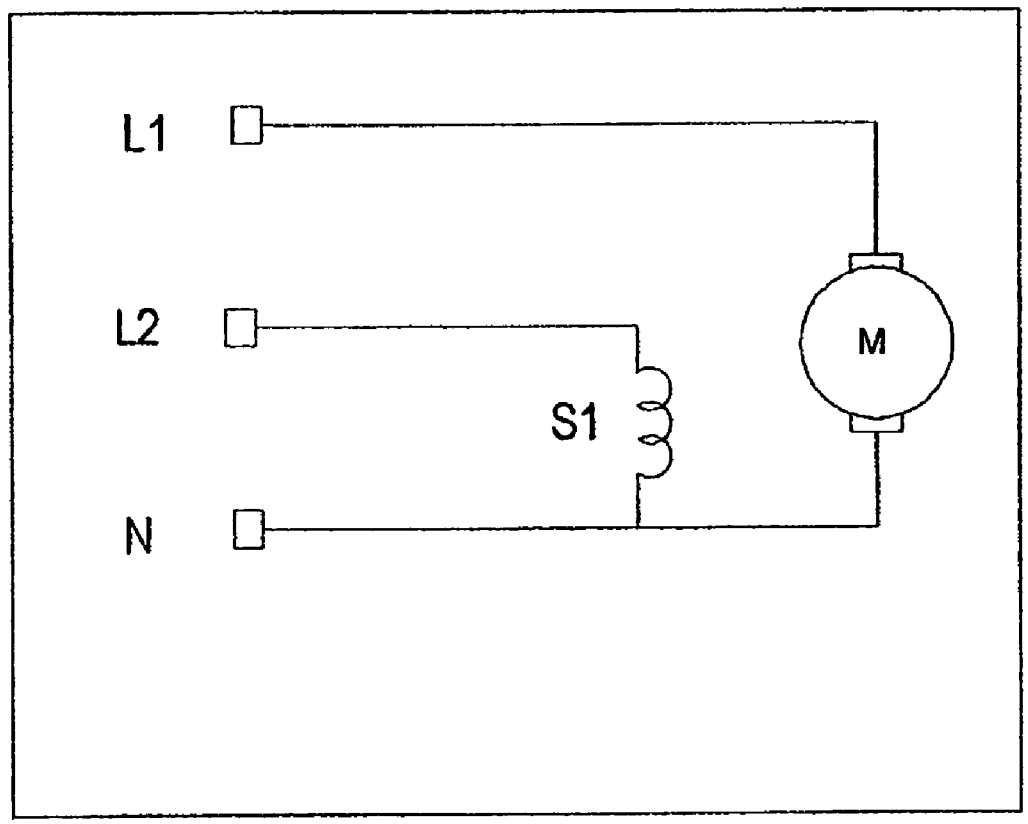
FIG. 1 is a schematic illustration of a known control circuit for an ice dispensing cycle in a refrigerator or freezer.
Figure 3:
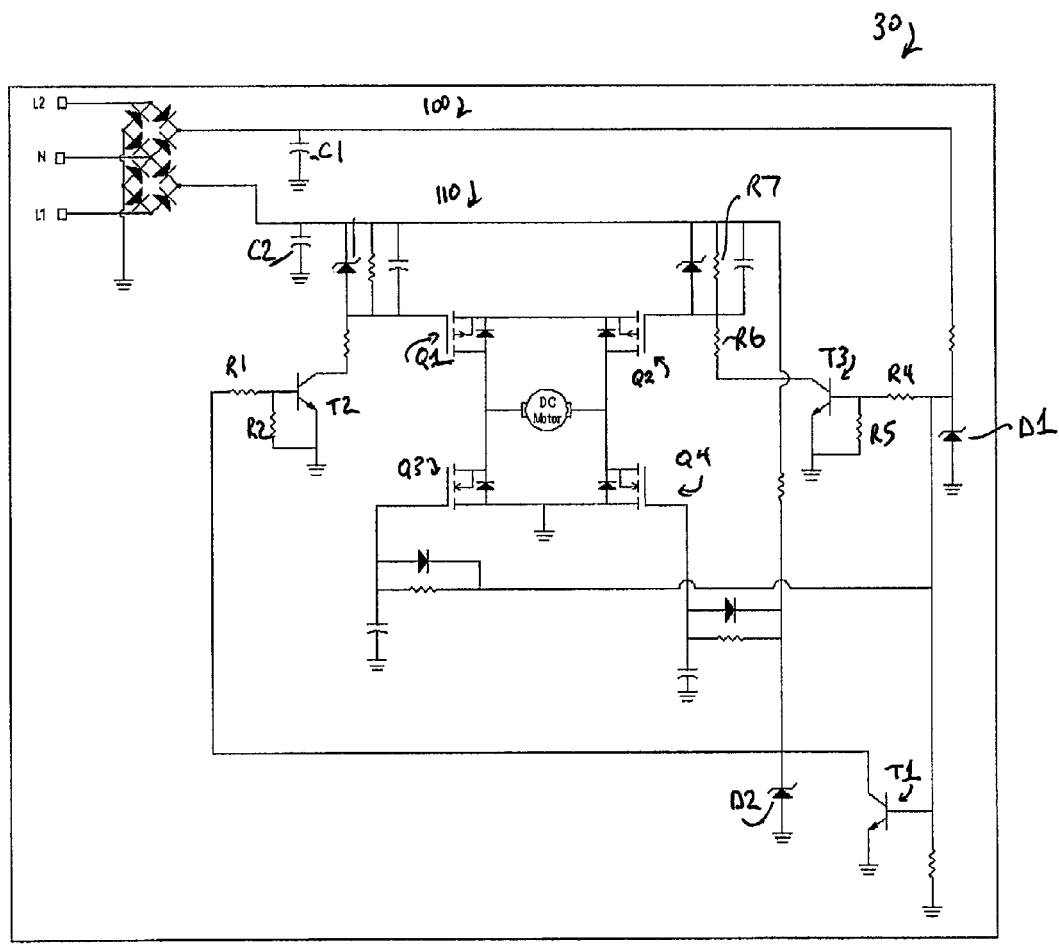
FIG. 3 is a schematic illustration of a control circuit for the ice dispensing mechanism of the present invention.

FIG. 3 is a schematic illustration of the control circuit 30. The circuit 30 is configured for connecting the bidirectional DC gear motor 35 to, for example, the known basic refrigerator or freezer electrical wiring configuration (i.e., L2-N-L1) as is depicted in FIG. 1.

Circuit 30 includes a plurality of MOSFET H-Bridges (Q1, Q2, Q3, Q4) for switching voltage polarity to the DC motor 35 windings, allowing the motor 35 to selectively operate in clockwise and counter clockwise directions. To allow the DC motor 35 to interface with existing AC power lines L2, L1, peripheral circuitry 100, 110 is provided to rectify the power lines L1, L2. In a preferred embodiment, L1 is used as the primary power source for the DC gear motor 35, which is necessary as some existing refrigerator and freezer designs have significantly lower current available in L2 compared to L1, L2 is used as a control line to determine the state of the four MOSFETS (Q1, Q2, Q3, Q4).

Peripheral circuitry 100 includes capacitor C1 and diode D1. Peripheral circuitry 110 includes capacitor C2 and diode D2. Transistors T1, T2, T3, resistors R1-R7, and diode D3 are provided across lines between L1 and L2. Other capacitors, resistors and diodes (not labeled) are provided as indicated on FIG. 3. The external diodes, resistors and capacitors control the timing of the state changes for the four MOSFET H-Bridges (Q1, Q2, Q3, Q4) to prevent damage to the devices.

Figure 4:
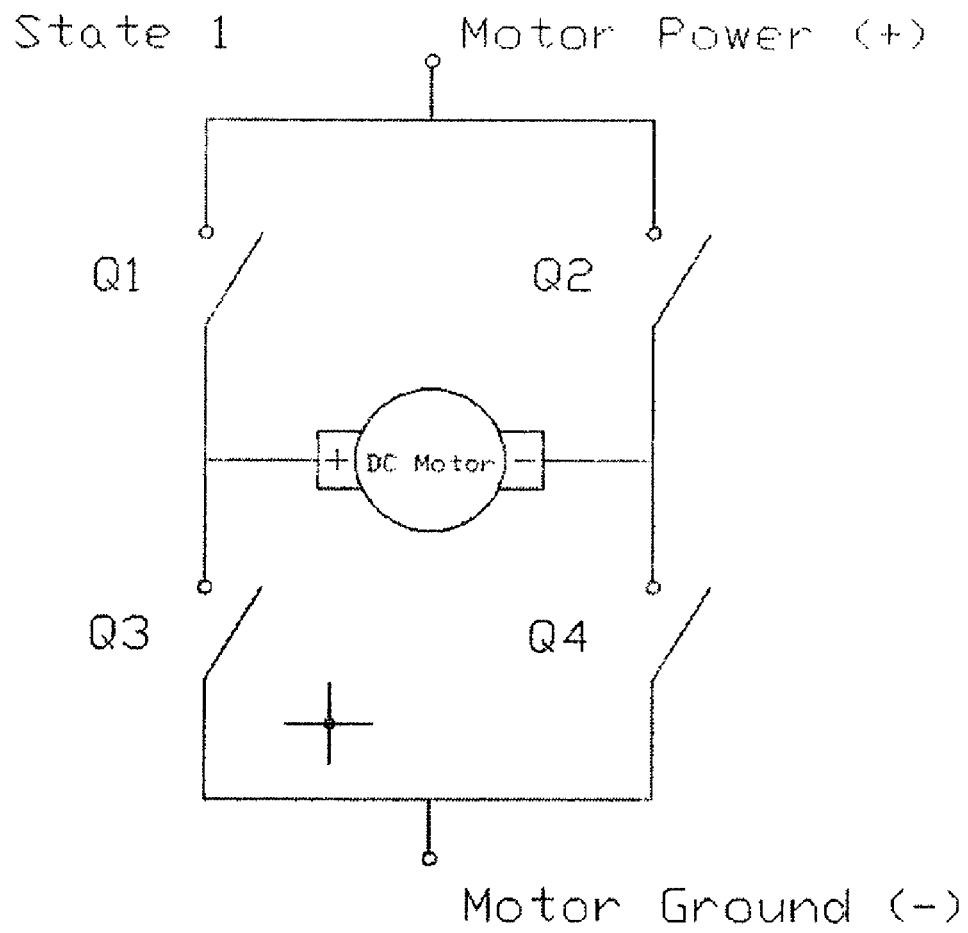
FIG. 4 is a schematic illustration of an H-bridge of the control circuit for the ice dispensing mechanism of the present invention.
Figure 5:
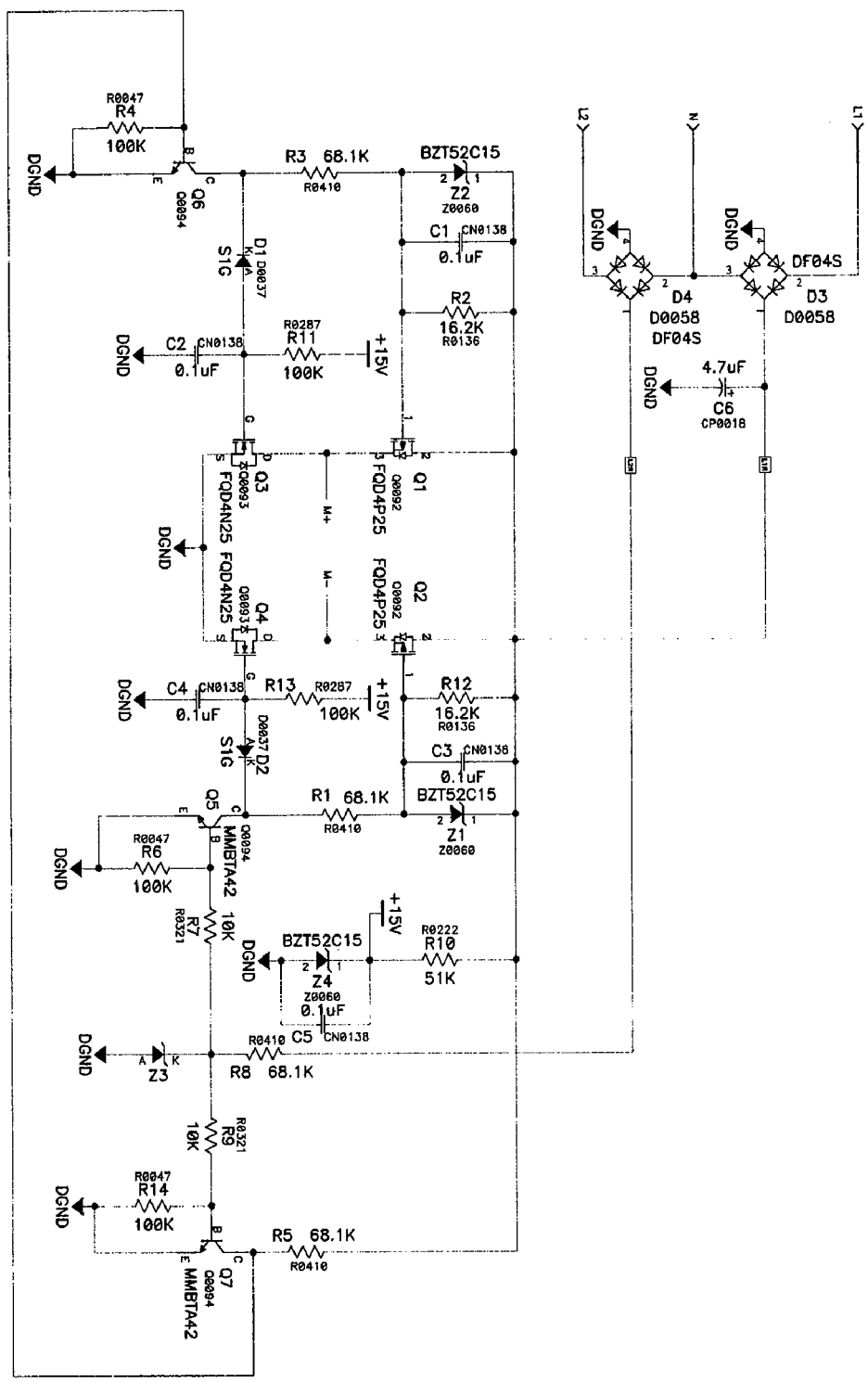
FIG. 5 is a schematic illustration of a control circuit for the ice dispensing mechanism of the present invention, showing a preferred embodiment of various componentry. The values are provided as one possible embodiment and are not limiting. It will be apparent to one skilled in the art that other values of componentry could be selected.

When L1 is energized (115 VAC), Q1 and Q4 are turned on. When Q1 and Q4 MOSFETS are on DC current flows through the devices allowing the DC motor to turn in a clockwise or counter clockwise direction depending on how the polarity of the motor terminals are connect to the circuit. (State 1, see FIG. 4)

When both L1 and L2 are energized (115 VAC), Q1 and Q4 are turned OFF and Q2 and Q3 are turned ON. When Q2 and Q3 MOSFETS are turned on, the DC current flows through the devices allowing the DC motor to turn in the opposite direction as described in State 1. (State 2)

When L1 and L2 are de-energized, Q1, Q2, Q3 and Q4 are OFF and no current flows through the motor. (State 3)

In operation, when L1 is energized the DC motor 35 runs in either the clockwise counterclockwise direction (as required by the ice system requirements). When both L1 and L2 are both energized the DC motor 35 runs in the opposite direction allowing, for example, for the delivery of cubed ice in one direction and crushed or shaved ice in the other.

Although it is believed to be apparent from the foregoing description, the present invention also comprises a method for dispensing or delivering ice. The method comprises the steps of providing a refrigerator or freezer housing with a DC gear motor assembly positioned within the housing; providing an AC power source to the housing; providing a rectifying or reversing circuit to rectify the AC power source to provide power to the DC gear motor assembly; and using the gear motor assembly to operate ice dispensing or ice delivery apparatus.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall there between.

What is claimed is:

1. A reversing circuit for a DC gear motor used in ice delivery apparatus to enable selective operation of the motor in clockwise and counter-clockwise directions, the circuit comprising:
    (a) a plurality of MOSFET H-Bridges connected to the DC gear motor; and
    (b) peripheral circuitry connected between an AC power source and the MOSFET H-Bridge to rectify the AC power source and supply power to the DC gear motor, wherein
    the plurality of MOSFET H-Bridges includes only a first pair of MOSFETs located diagonal from each other and a second pair of MOSFETs located diagonal from each other, the first pair of MOSFETs and second pair of MOSFETs connected in an "H" bridge,
    the motor turns in a first direction when the first pair of MOSFETs are turned on and the motor turns in a second direction opposite to the first direction when the second pair of MOSFETs are turned on, and
    when the motor turns in the first direction, the motor delivers cubed ice, and when the motor turns in the second direction, the motor delivers shaved ice.

2. A gear motor assembly for delivering ice, the gear motor assembly comprising:
    (a) a bidirectional DC gear motor;
    (b) an external AC power source;
    (c) a circuit connected between the AC power source and the gear motor to provide power to the gear motor; and
    (d) a MOSFET H-Bridge having two pairs of MOSFETs connected to the gear motor, wherein
    the two pairs of MOSFETs are the only MOSFETs in the gear motor assembly, and
    when the motor turns in the first direction, the motor delivers cubed ice, and when the motor turns in the second direction, the motor delivers shaved ice.

3. An ice delivery system, comprising:
    (a) a housing for storing ice;
    (b) a DC gear motor assembly mounted within the housing, the DC gear motor using AC power;
    (c) an AC power line connected to an AC power source located outside of the housing to supply the gear motor with power;
    (d) a MOSFET H-Bridge having no more than two pairs of MOSFETs connected to the gear motor;
    (e) a reversing circuit for rectifying the AC power line to supply power to the gear motor;
    (f) an output shaft attached to the gear motor assembly, the output shaft selectively rotatable in opposite directions; and (g) an implement attached to the output shaft for manipulating the ice, wherein when the motor turns in the first direction, the motor delivers cubed ice, and when the motor turns in the second direction, the motor delivers shaved ice.

4. A method of replacing a unidirection motor for delivering ice with a bidirection motor for delivering ice, the method comprising:
- (a) providing a retrofit housing with a gear motor assembly, the gear motor assembly positioned within the retrofit housing;
- (b) providing an existing AC power source to the bidirection motor that was previously used with the unidirection motor;
- (c) providing a circuit to enable interfacing of the bidirectional motor with the existing AC power source such that the existing AC power source is converted to DC power;
- (d) powering the gear motor assembly to operate ice delivery;
- (e) turning the motor in a first direction to deliver cubed ice; and
- (f) turning the motor in a second direction to deliver shaved ice.

5. The method according to claim 4, further comprising the step of:

controlling timing of a change in the first direction and the second direction to prevent damage to the bidirectional motor.

6. The method according to claim 4, wherein the retrofit housing requires no rewiring of the existing AC power source.

* * * * *